(12) United States Patent
Myaguchi

(10) Patent No.: US 7,460,163 B2
(45) Date of Patent: Dec. 2, 2008

(54) LINE SENSOR SPATIALLY COMPRESSING CHARGE DISTRIBUTION

(75) Inventor: Kazuhisa Myaguchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 656 days.

(21) Appl. No.: 11/042,345

(22) Filed: Jan. 26, 2005

(65) Prior Publication Data

US 2005/0185076 A1  Aug. 25, 2005

Related U.S. Application Data

(63) Continuation-in-part of application No. PCT/JP03/09411, filed on Jul. 24, 2003.

(30) Foreign Application Priority Data

Jul. 26, 2002 (JP) ............................ P2002-218407

(51) Int. Cl.
   *H04N 5/225* (2006.01)
(52) U.S. Cl. .................................. 348/297; 348/308
(58) Field of Classification Search ............... 348/294, 348/297, 300, 308
   See application file for complete search history.

(56) References Cited

U.S. PATENT DOCUMENTS 7,292,276 B2 * 11/2007 Egawa et al. ............... 348/308

FOREIGN PATENT DOCUMENTS

| JP | 57-166767 | 10/1982 |
| JP | 4-056461 | 2/1992 |

* cited by examiner

*Primary Examiner*—Tuan V Ho
(74) *Attorney, Agent, or Firm*—Drinker Biddle & Reath LLP

(57) ABSTRACT

The line sensor 100 comprises an image pick-up part 10, charge integrator 20 and charge output part 30. The image pick-up part comprises an N pixel parts $11_1$ to $11_N$ arranged in one direction, an nth pixel part $11_n$ comprises an M photosensitive regions $12_{1,n}$ to $12_{M,n}$ that generate and accumulate charge in response to an incident energy beam. The charge integrator 20 comprises an N integrators $21_1$ to $21_N$, and the charge output part 30 comprises an N output parts $31_1$ to $31_N$. The charges generated and accumulated by each of the M photosensitive regions $12_{1,n}$ to $12_{M,n}$ that the nth pixel part $11_n$ comprises are accumulated and integrated by the nth integrator $21_n$ and output to the nth output part $31_n$ in a batch.

4 Claims, 6 Drawing Sheets

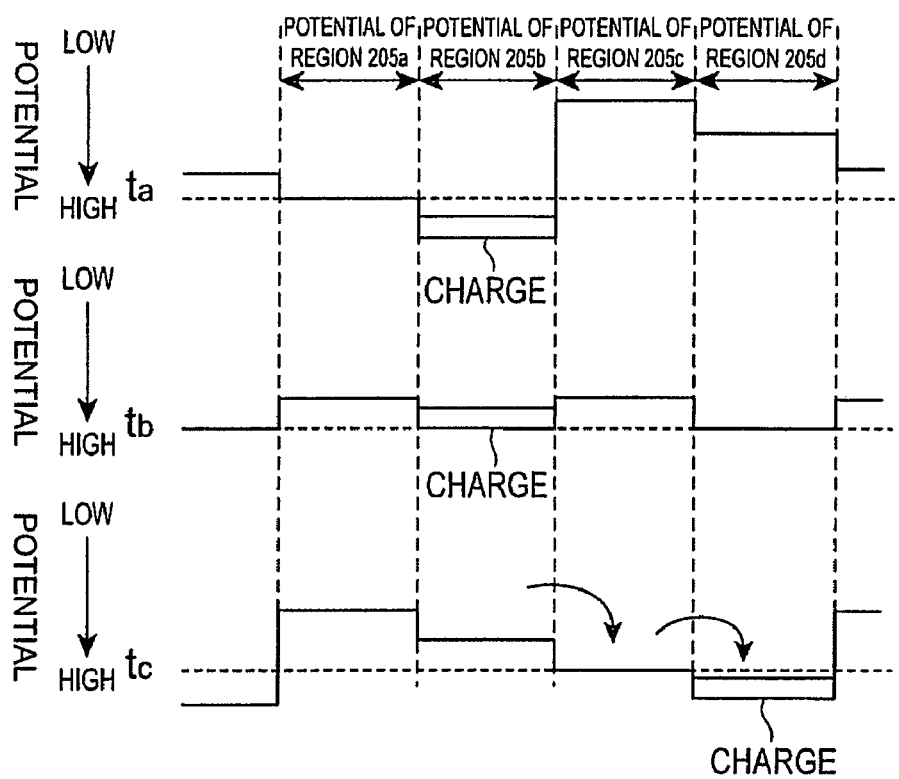

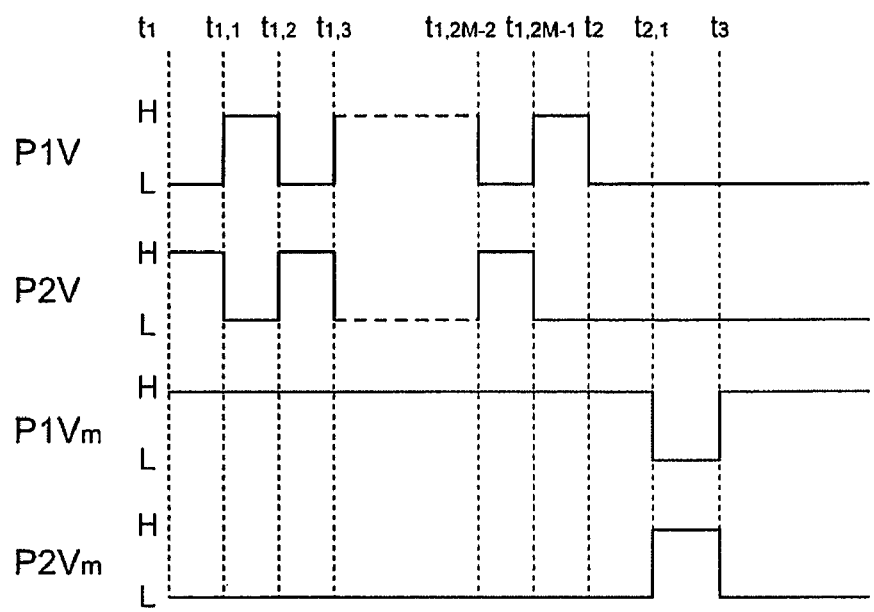
Fig.5A P1V
Fig.5B P2V
Fig.5C P1Vm
Fig.5D P2Vm
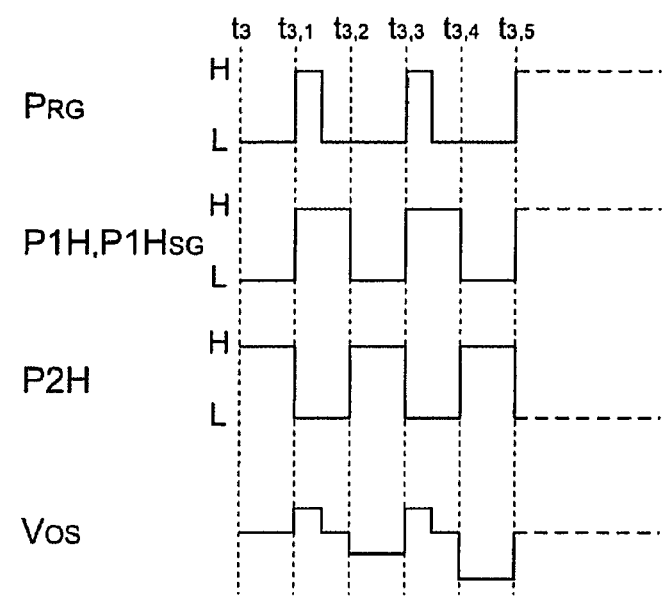
Fig.5E PRG
Fig.5F P1H,P1HSG
Fig.5G P2H
Fig.5H VOS

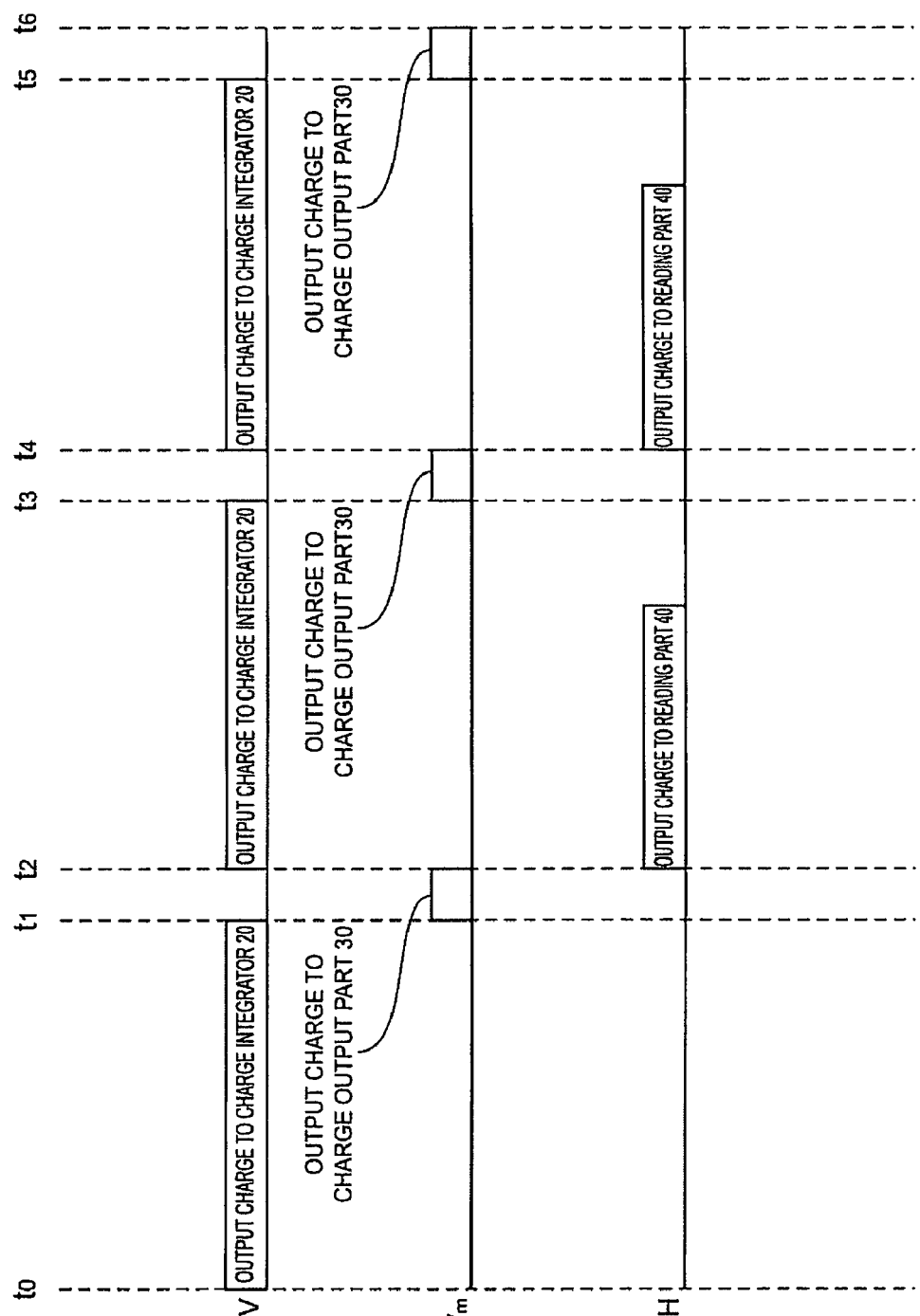

US 7,460,163 B2

LINE SENSOR SPATIALLY COMPRESSING CHARGE DISTRIBUTION

RELATED APPLICATION

This application is a continuation-in-part of international application No. PCT/JP03/09411, filed Jul. 24, 2003.

BACKGROUND OF THE INVENTION

1. Field of the Invention

The present invention relates to a line sensor in which two or more pixel parts are arranged in one direction.

2. Related Background of the Invention

Line sensors comprise an image pick-up part and a charge output part. The image pick-up part comprises a plurality of pixel parts and each of the plurality of pixel parts comprises photosensitive regions. In each of the plurality of photosensitive regions that the image pick-up part comprises charge is generated and accumulated in response to an incident energy beam. The charge output part, to which the charges generated and accumulated in each plurality of photosensitive regions are input, outputs these input charges in sequence.

SUMMARY OF THE INVENTION

The sensitivity of a line sensor is dependent on the cross-sectional area of its photosensitive regions. To improve the sensitivity of a line sensor the area of its photosensitive regions should be increased. However, there is a problem inherent to line sensors, that is to say, although sensitivity can be increased there is a resultant increase in noise.

The present invention is contrived to resolve the above-mentioned problem, and its object is to provide a line sensor in which the sensitivity can be improved and the increase in noise can be suppressed.

The line sensor pertaining to the present invention, which constitutes a line sensor in which an N (N is an integer of 2 or more) pixel parts are arranged in one direction, is characterized in that it comprises an image pick-up part, comprising an N pixel parts each comprising an M photosensitive regions (M is an integer of 2 or more) in that charge is generated and accumulated in response to an incident energy beam, which outputs the charges generated and accumulated in the M photosensitive regions that each of the N pixel parts comprise, a charge integrator, comprising an N integrators, to which the charges generated and accumulated in the M photosensitive regions that an nth (n is any integer of 1 or more and no more than N) pixel part of the image pick-up part comprises are input, and which integrates and accumulates the input charges in an nth integrator, and outputs the charges integrated and accumulated in each N integrators at the same time, and a charge output part, comprising an N output parts, to which the charges output from the nth integrator of the charge integrator are input, and which accumulates the input charges in an nth output part, and outputs the charges accumulated in each N output parts in sequence.

In this line sensor, charges are generated and accumulated in the M photosensitive regions contained in each of the N pixel parts due to an incident energy beam on the image pick-up part. The charges generated and accumulated in the M photosensitive regions contained in the nth pixel part are output from the image pick-up part and integrated and accumulated in the nth integrator contained in the charge integrator and, thereafter, are output from the nth integrator in a batch. The charges output from the nth integrator are accumulated in the nth output part of the charge output parts and, thereafter, are output from the Nth output part in sequence. Accordingly, the sensitivity of the line sensor can be improved and increase in noise can be suppressed.

In addition, in the line sensor pertaining to the present invention, the saturation charge amount of the nth integrator is larger than the sum of the saturation charge amounts of each of the M photosensitive regions that the nth pixel part comprises, and it is preferable that the saturation charge amount of the nth output part is either larger than the saturation charge amount of the nth integrator or substantially equivalent to the saturation charge amount of the nth integrator.

If this is case, the nth integrator can integrate and accumulate the charges generated and accumulated in each M photosensitive regions contained in the nth pixel part, and the nth output part can accumulate the charges output from the nth integrator in a batch.

In addition, in the line sensor pertaining to the present invention, it is preferable that the image pick-up part transfers the charges generated and accumulated in the (m−1)th photosensitive region (m is any integer of 2 or more and no more than M) to the Mth photosensitive region by way of an (M−m) photosensitive regions from an mth photosensitive region to a (M−1)th photosensitive region, and that it outputs the charges generated and accumulated in each M photosensitive regions to the charge integrator in sequence from the charges generated and accumulated in the Mth photosensitive region. If this is the case, the charges generated and accumulated in each M photosensitive regions can be output to the charge integrator in sequence and the configuration of the line sensor can be simplified.

BRIEF DESCRIPTION OF THE DRAWINGS

FIG. 4A, FIG. 4B and FIG. 4C are potential diagrams showing the charge state of the element 200 for the transfer of charge at times $t_a$, $t_b$, $t_c$.

FIG. 4D is a timing chart illustrating the logic levels of clock signals P1, P2 input into electrodes 202a to 202d of the element 200 for the transfer of charge;

FIG. 5A, FIG. 5B, FIG. 5C and FIG. 5D are timing charts for explaining the operation of the image pick-up part 10 and charge integrator 20 that the line sensor 100 pertaining to the present embodiment of this invention comprises;

FIG. 5E, FIG. 5F, FIG. 5G and FIG. 5H are timing charts for explaining the operation of the charge output part 30 and readout part 40 that the line sensor 100 pertaining to the present embodiment of this invention comprises; and FIG. 6A, FIG. 6B and FIG. 6C are timing charts for explaining the operation of the image pick-up part 10, charge integrator 20 and charge output part 30 of the line sensor 100 pertaining to the present embodiment.

DESCRIPTION OF THE PREFERRED EMBODIMENTS

A detailed description of an embodiment of the present invention is given below with reference to the attached diagrams. It should be noted that, in the description of the diagrams, identical symbols have been assigned to identical or equivalent elements and replications of the descriptions thereof have been omitted.

First, a description will be given of an embodiment of the line sensor pertaining to the present invention.

Figure 1:
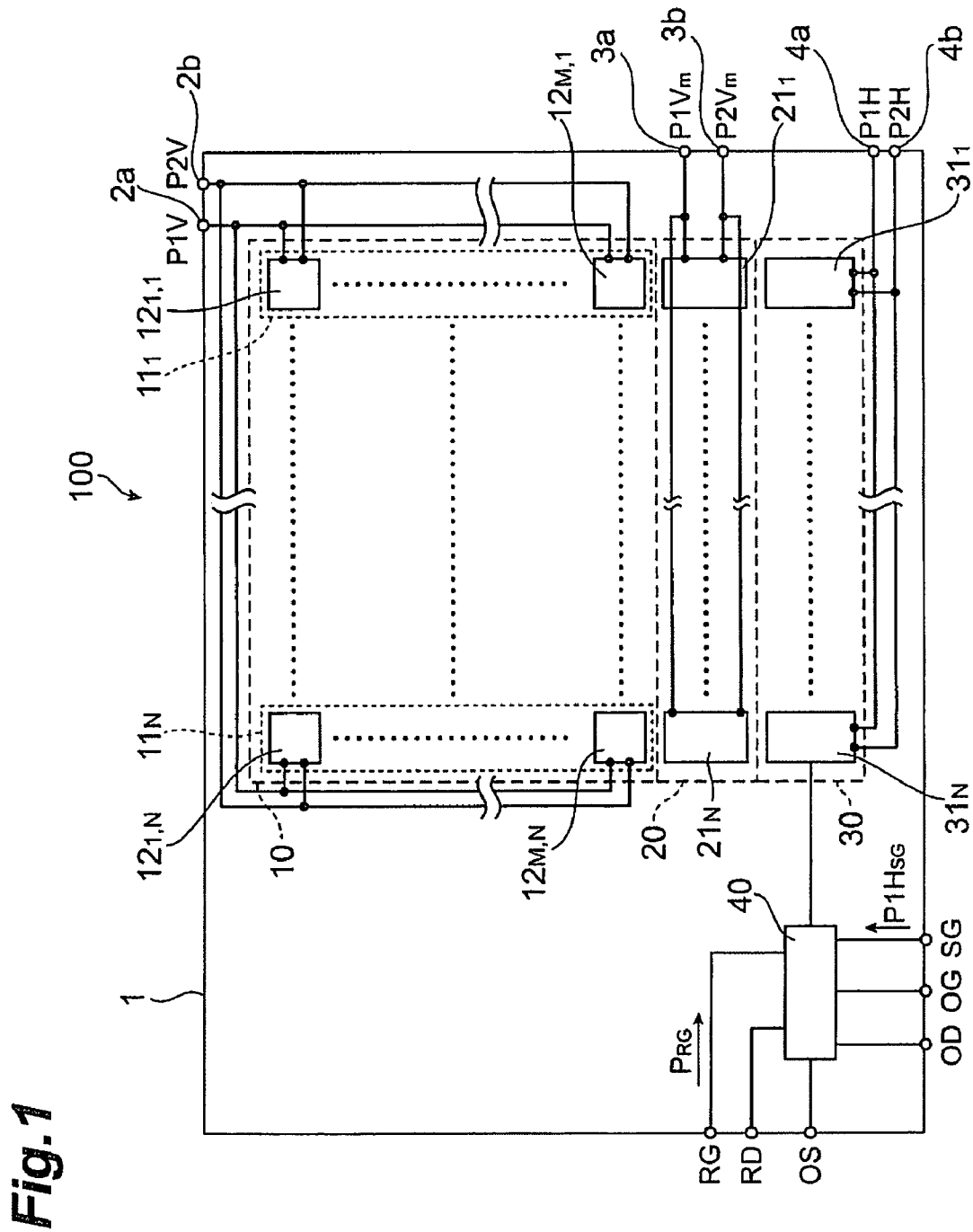
FIG. 1 is a diagram of the configuration of a line sensor 100 pertaining to the present embodiment.

FIG. 1 is a diagram of the configuration of a line sensor 100 pertaining to the embodiment.

The line sensor 100 comprises an image pick-up part 10 on which images fall incident on the top thereof, a charge integrator 20 connected to an image pick-up part 10 for integrating the charges generated in the image pick-up part 10, a charge output part 30 connected to the charge integrator 20 for transferring the integrated charges, and a readout part 40 provided at the end of the charge output part 30. In addition, these elements are provided on a semiconductor substrate 1.

The image pick-up part 10 comprises an N pixel parts $11_1$ to $11_N$ (vertical shift registers) from a first pixel part $11_1$ to an Nth pixel part $11_N$ (N is an integer of 2 or more). The N pixel parts $11_1$ to $11_N$ is arranged in one direction.

An M photosensitive regions $12_{1,n}$ to $12_{M,n}$ from a 1st photosensitive region $12_{1,n}$ to an Mth photosensitive region $12_{M,n}$ (M is an integer of 2 or more) are arranged in an nth pixel part $11_n$ (n is any integer of 1 or more and no more than N). In other words, the image pick-up part 10 comprises an M×N photosensitive regions $12_{1,1}$ to $12_{M,N}$ arranged in M lines and N rows. Furthermore, the direction from the 1st pixel part $11_1$ to the Nth pixel part $11_N$ is taken to be the horizontal direction, and the direction from the 1st photosensitive region $12_{1,n}$ to the Mth photosensitive region $12_{M,n}$ which the nth pixel part $11_n$ comprises is taken to be the vertical direction.

Each of the M×N photosensitive regions $12_{1,1}$ to $12_{M,N}$ generates a charge in response to an incident energy beam (x-ray, visible light, infrared, ultraviolet and so on) and accumulates these generated charges. In addition, two phases of clock signal P1V, P2V are input into each of the M×N photosensitive regions $12_{1,1}$ to $12_{M,N}$. The clock signal P1V, which is output by a signal output part (not shown in the diagram) provided separately to the line sensor 100, is input in a terminal 2a of the semiconductor 1, and is input into each of the M×N photosensitive regions $12_{1,1}$ to $12_{M,N}$ by way of this terminal 2a. In the same way, the clock signal P2V, which is output by a signal output part (not shown in the diagram) provided separately to the line sensor 100, is input in a terminal 2b of the semiconductor 1, and is input into each of the M×N photosensitive regions $12_{1,1}$ to $12_{M,N}$ by way of this terminal 2b.

In addition, the (m-1)th photosensitive region $12_{m-1,n}$ (m is any integer of 2 or more and no more than M) that the nth pixel part $11_n$ comprises, which is connected to the mth photosensitive region $12_{m,n}$ in such a way that charge can be transferred, transfers self-generated and accumulated charges to the mth photosensitive region $12_{m,n}$ by switching the logic level of the clock signals P1V, P2V from the high (H) level to the low (L) level. By the switching of the logic level of the clock signals P1V, P2V between the high H level and the low L level, the charges generated and accumulated by the M×N photosensitive regions $12_{1,1}$ to $12_{M,N}$ are transferred in the vertical direction in sequence to be output to the charge integrator 20 from the image pick-up part 10. It should be noted that a description of the output of these charges is given later with reference to FIG. 5A and FIG. 5B.

The charge integrator 20 comprises an N integrators $21_1$ to $21_N$ from a 1st integrator $21_1$ to an Nth integrator $21_N$. The nth integrator $21_n$ of the charge integrator 20, which is connected to the nth pixel part $11_n$ of the image pick-up part 10 in such a way that charge can be input, accumulates input charges that are output from the nth pixel part $11_n$ of the image pick-up part 10. The saturation charge amount of the nth integrator $21_n$ is larger than the sum of the saturation charge amounts of each of the M photosensitive regions $12_{1,n}$ to $12_{M,N}$ that the nth pixel part $11_n$ comprises. In addition, the charge integrator 20 is shielded from light by a metal such as aluminum.

The nth integrator $21_n$ accumulates all of the charges generated and accumulated by each of the M photosensitive regions $12_{1,n}$ to $12_{M,n}$ that the nth pixel part $11_n$ comprises. That is to say, the nth integrator $21_n$ integrates and accumulates the charges output from the nth pixel part $11_n$.

Clock signals $P1V_m$, $P2V_m$ are input into each of the N integrators $21_1$ to $21_N$. It should be noted that the clock signal $P1V_m$, which is output by a signal output part (not shown in the diagram) provided separately to the line sensor 100, is input in a terminal 3a, and is input in each of the N integrators $21_1$ to $21_N$ by way of the terminal 3a. Similarly, the clock signal $P2V_m$, which is output by a signal output part (not shown in the diagram) provided separately to the line sensor 100, is input in a terminal 3b, and is input in each of the N integrators $21_1$ to $21_N$ by way of the terminal 3b.

The charges integrated and accumulated in each of the N integrators $21_1$ to $21_N$ are transferred in the vertical direction to be output to the charge output part 30 from the charge integrator 20 as a batch by the switching of the logic levels of the clock signals $P1V_m$, $P2V_m$ between the H level and the L level. The specific details thereof are provided in a later description given with reference to FIG. 5C and FIG. 5D.

The charge output part 30 comprises an N output parts $31_1$ to $31_N$ from a 1st output part $31_1$ to an Nth output part $31_N$. The nth output part $31_n$ of the charge output part 30, which is connected to the nth integrator $21_n$ in such a way that charge can be input, accumulates the input charges output from the nth integrator $21_n$ in a batch. In addition, the charge output part 30 is shielded from light by a metal such as aluminum.

In such a way that the charges input from the nth integrator $21_n$ can be accumulated the saturation charge amount of the nth output part $31_n$ is either larger than the saturation charge amount of the nth integrator $21_n$ or substantially equivalent to the saturation charge amount of the nth integrator $21_n$. More particularly, when the saturation charge amount of the nth output part $31_n$ is substantially equivalent to the saturation charge amount of the nth integrator $21_n$, compared to when the saturation charge amount of the nth output part $31_n$ is larger than the saturation charge amount of the nth integrator $21_n$, the cross-sectional area of the charge output part 30 can be reduced.

In addition, clock signals P1H, P2H are input into each of the N output parts $31_1$ to $31_N$. It should be noted that the clock signal P1H, which is output by a signal output part (not shown in the diagram) provided separately to the line sensor 100, is input into a terminal 4a, and input into each of the N output parts $31_1$ to $31_N$ by way of the terminal 4a. Similarly, the clock signal P2H, which is output by a signal output part (not shown in the diagram) provided separately to the line sensor 100, is input into a terminal 4b and input into each of the N output parts $31_1$ to $31_N$ by way of the terminal 4b.

In addition, an (x-1)th output part $31_{x-1}$ (x is any integer of 2 or more and no more than N), which is connected to an xth output part $31_x$ in such a way that charges can be transferred, transfers self-input charges to the xht output part $31_x$ by the switching of the logic levels of the clock signal P1H, P2H between the H level and the L level. The charges input to and accumulated in each of the N output parts $31_1$ to $31_N$ are transferred in the horizontal direction to be output in to the readout part 40 from the charge output part 30 sequence by the switching of the logic level of the clock signals P1H, P2H between the H level and the L level. A description of the specific details thereof will be given later with reference to FIG. 5E, FIG. 5F, FIG. 5G and FIG. 5H.

The readout part 40 outputs an electrical signal of a voltage proportionate to the amount of charge output by the charge output part 30. A detailed description of the readout part 40 is given below.

Figure 2:
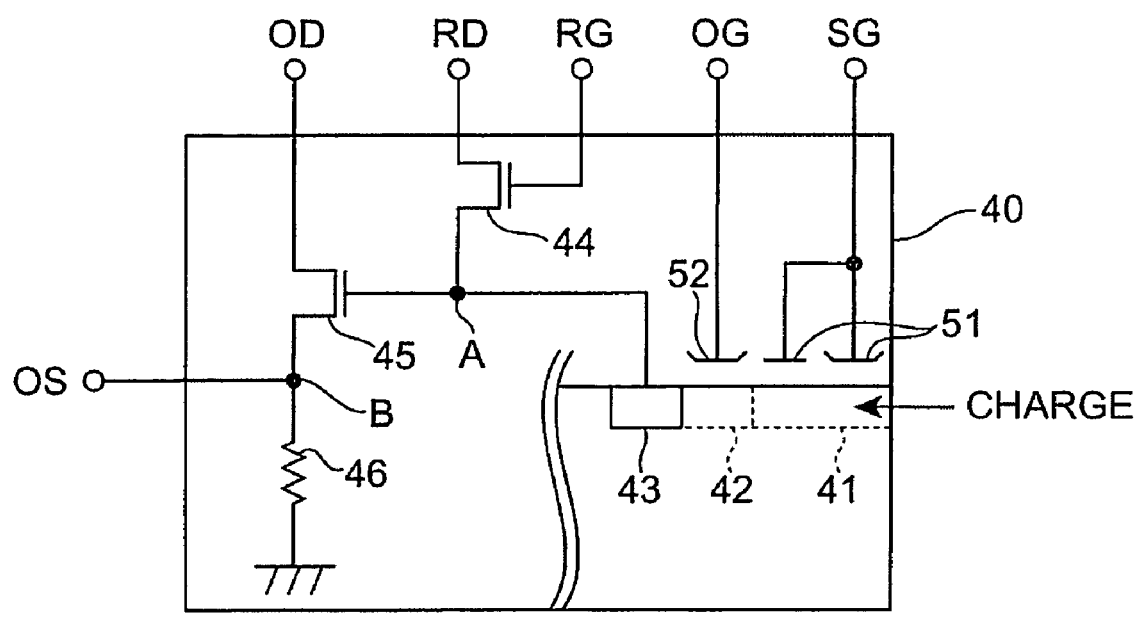
FIG. 2 is a diagram for explaining the configuration of a readout part 40 of the line sensor 100 pertaining to the present embodiment.

FIG. 2 is a diagram for explaining the configuration of the readout part 40 that the line sensor 100 pertaining to the embodiment comprises. The readout part 40 comprises a summing gate part 41, output gate part 42, floating diffusion 43, charge reset MOSFET 44, and charge voltage conversion MOSFET 45.

The summing gate part 41, which connects to the Nth output part $31_N$ of the charge output part 30, accumulates input charges output from the Nth output part $31_N$. A summing gate electrode 51 for controlling the summing gate part 41 is connected to a terminal SG. The terminal SG connects to a signal output part (not shown in the diagram) provided separately to the line sensor 100 for outputting a clock signal $P1H_{SG}$. A description of the operation of the readout part 40 is given later with reference to FIG. 5E, FIG. 5F, FIG. 5G and FIG. 5H.

In addition, the summing gate part 41, in the same way as the N integrators $21_1$ to $21_N$, is able to integrate the charges output from the N output parts $31_1$ to $31_N$. For example, the summing gate part 41 integrates the charges input into each of the 1st output part $31_1$ and 2nd output part $31_2$, integrates the charges input into each of the 3rd output part $31_3$ and 4th output part $31_4$ and, in the same way, integrates the charges input into each of the other output parts $31_5$ to $31_N$. By the integrating of the charges by not only the nth integrator $21_n$ but also the summing gate part 41 in this way, the charges generated and accumulated by the M×N photosensitive regions $12_{1,1}$ to $12_{M,N}$ of the image pick-up part 10 can be integrated in not only the vertical direction but also in the horizontal direction.

In addition, the input charges accumulated by the summing gate part 41 are output to the output gate part 42 from the summing gate part 41 by the switching of the logic levels of the clock signal $P1H_{SG}$ from the H level to the L level.

The output gate part 42 is connected to the summing gate part 41 and the charges output from the summing gate part 41 are input thereto. An output gate electrode 52 for controlling the output gate part 42 is connected to a terminal OG and a fixed voltage is input thereto from the terminal OG. In addition, the output gate part 42, due to this self-input voltage of a fixed voltage, prevents charge from flowing reversely.

The charges output from the summing gate part 41 pass through the output gate part 42 and reach a floating diffusion 43.

The floating diffusion 43 has a fixed electric potential when there is no inflow of charge, and this electric potential is changed by the inflow of charge. In addition, the floating diffusion 43 is connected at a connection point A. This connection point A is connected to a source terminal of the charge reset MOSFET 44.

The gate terminal of the charge reset MOSFET 44 connects to a terminal RG. A reset signal $P_{RG}$ is input into the terminal RG. It should be noted that the reset signal $P_{RG}$ is output to the terminal RG by a signal output part (not shown in the diagram) provided separately to the line sensor 100 for outputting a reset signal $P_{RG}$, and is input into the gate terminal of the charge reset MOSFET 44 by way of the terminal RG.

The signal output part outputs a reset signal $P_{RG}$ of which the logic level is either the H level or the L level. When a reset signal $P_{RG}$ of which the logic level is a L level is input into the gate terminal of the charge reset MOSFET 44 the charge reset MOSFET 44 forms the non-conducting state, and when a reset signal $P_{RG}$ of which the logic level is a H level is input into the gate terminal of the charge reset MOSFET 44 the charge reset MOSFET 44 forms the conducting state.

A terminal RD is connected to a drain terminal of the charge reset MOSFET 44 and a voltage of a fixed positive voltage is input thereto. When the charge reset MOSFET 44 forms a conducting state the charge inflowing into the floating diffusion 43 can be discharged and the floating diffusion 43 can be restored to its original fixed electric potential.

In addition, the connection point A is connected to the gate terminal of the charge voltage conversion MOSFET 45. When the floating diffusion 43 is a fixed electric potential the voltage $V_{CC}$ is input into the gate terminal of the charge voltage conversion MOSFET 45 and, when charge inflows into the floating diffusion 43 a voltage $V_e$ proportionate to the inflow charge amount is subtracted from the voltage $V_{CC}$, and the voltage equivalent to this subtracted voltage ($V_{CC}-V_e$) is input into the gate terminal of the charge voltage conversion MOSFET 45.

The drain terminal of the charge voltage conversion MOSFET 45 is connected to a terminal OD, and a voltage of a fixed positive voltage is input into this terminal OD. The source terminal of the charge voltage conversion MOSFET 45 is connected to a connection point B, and the connection point B is connected to one end of a resistor 46. The other end of the resistor 46 is grounded. In addition, the connection point B is connected to the terminal OS. An electric signal $V_{OS}$, as the output, is output from the terminal OS.

Although a description will be given of the operation of the line sensor 100 pertaining to this embodiment, a description will be given prior to this of charge transfer using, as an example, an element in which the charge transfer system is a 2-phase system.

Figure 3A:
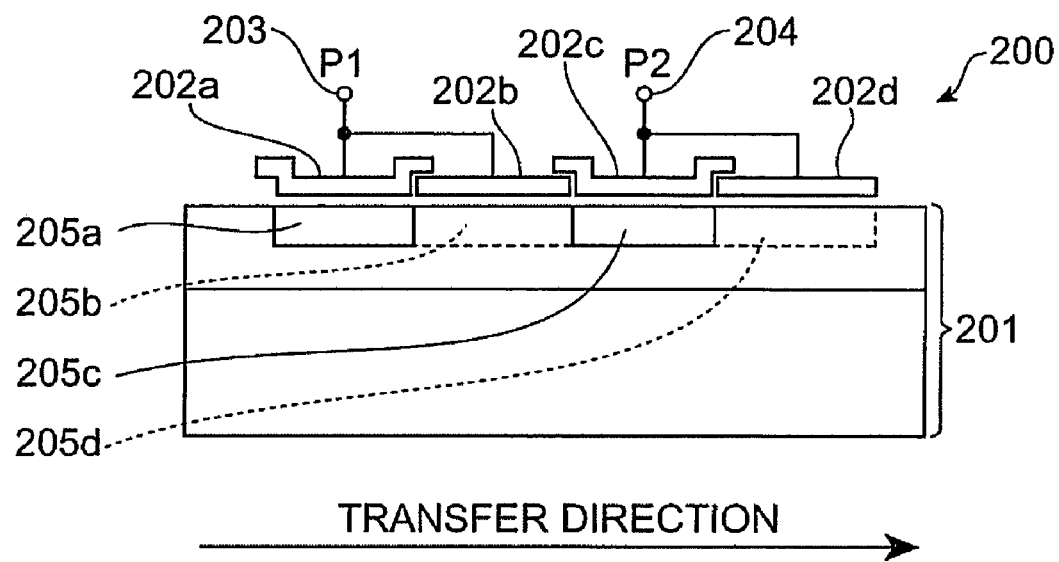
FIG. 3A is a diagram of the configuration of the element 200 for the transfer of charge.
Figure 3B:
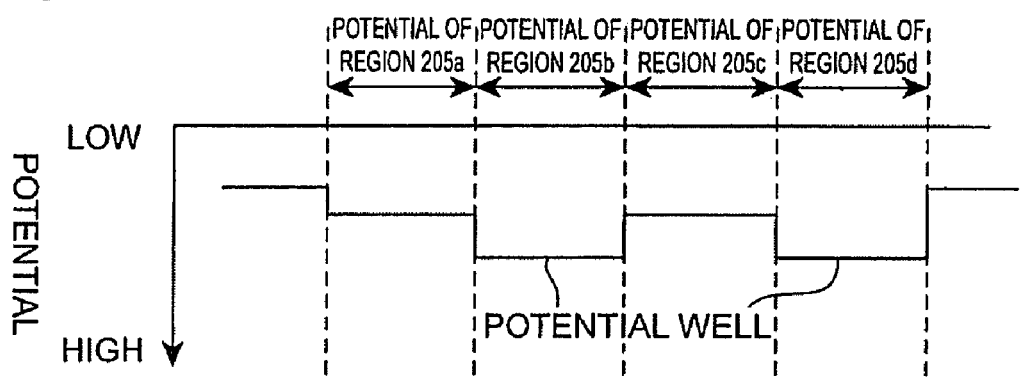
FIG. 3B is a potential diagram thereof.

It should be noted that the description given with reference to FIG. 3A and FIGS. 3B describes only the state in which charges have been transferred and accumulated, and the present invention is in no way restricted to the description given with reference to FIG. 3A and FIG. 3B.

FIG. 3A is a diagram of the configuration of the element 200 for the transfer of charge, and FIG. 3B is a potential diagram thereof. The element 200 shown in FIG. 3A is configured from, for example, electrodes 202a to 202d formed on the upper surface of a p-type silicon substrate 201 on which, by way of an insulating film ( not shown in the diagram), an n-type layer is formed on the upper surface. In addition, a clock signal P1 of which the logic level is either a H level or L level is input in the electrodes 202a, 202b by way of a terminal 203, and a clock signal P2 of which the logic level is either a H level or L level is input in the electrodes 202c, 202d by way of a terminal 204. In addition, the p-type silicon substrate 201 on which an n-type layer is formed on the upper surface comprises on the n-type layer under the electrode 202a a barrier region 205a on which p-type impurities or n-type impurities have been diffused or ion-implanted, on the n-type layer under the electrode 202b a region 205b on which neither p-type impurities nor n-type impurities have been diffused or ion-implanted, on the n-type layer under the electrode 202c a barrier region 205c on which p-type impurities or n-type impurities have been diffused or ion-implanted, and on the n-type layer under the electrode 202d a region 205d on which neither p-type impurities nor n-type impurities have been diffused or ion-implanted.

FIG. 3B shows the potential profile of the charge transfer element of FIG. 3A when, by way of example, the clock signals P1, P2 are held at the L level. In this state there is no potential well produced in the barrier regions 205a, 205c, and in the regions 205b, 205d on which there is no diffusion or implantation of impurities, a potential well of comparatively shallow potential and proportionate to the L level voltage $V_L$ is generated. For this reason, the regions 205b, 205d on which impurities have been diffused or ion-implanted have higher potential than the barrier regions 205a, 205c.

The element 200 for the transfer of charge corresponds to either the mth photosensitive region $12_{m,n}$ of the nth pixel part $11_n$ that the image pick-up part 10 comprises, the nth integrator $21_n$ that the charge integrator 20 comprises, or the nth output part $31_n$ that the charge output part 30 comprises of the line sensor 100 pertaining to this embodiment. The clock signal P1 input into the electrodes 202a, 202b from the terminal 203 and the clock signal P2 input into the electrodes 202c, 202d from the terminal 204 correspond to either the clock signals P1V, P2V input into each of the M×N photosensitive regions $12_{1,1}$ to $12_{M,N}$, the clock signals P1V$_m$, P2V$_m$ input into each of the N integrators $21_1$ to $21_N$, or the clock signals P1H, P2H input into each of the N output parts $31_1$ to $31_N$.

The description given next is given with reference to FIG. 4A, FIG. 4B, FIG. 4C, and FIG. 4D. FIG. 4A, FIG. 4B, and FIG. 4C are potential diagrams showing the charge state of the element 200 for the transfer of charge at times ta, tb, tc, and FIG. 4D is a timing chart showing the logic levels of the clock signals P1, P2 input into the electrodes 202a to 202d of the element 200 for the transfer of charge.

First, at the time ta, the logic level of the clock signal P1 input into the terminal 203 is H, and the logic level of the clock signal P2 input into the terminal 204 is L. The potential of the regions 205a, 205b is high at this time. Of the regions 205a, 205b, charge accumulates in the region 205b of high potential in which no barrier region is formed.

Next, the logic levels of each of the clock signal P2 input into the terminal 204 and the clock signal P1 input into the terminal 203 is switched. The charges accumulated at the time $t_b$ of the switching are accumulated without alteration in the region 205b. It should be noted that, because of the low potential of the barrier regions 205a, 205c, no transfer of charge occurs in the reverse direction to the direction of transfer, for example, to the region 205a side.

Next, at the time tc, the logic level of the clock signal P1 input into the terminal 203 is L and the logic level of the clock signal P2 input into the terminal 204 is H. The potential of the regions 205c, 205d is high at this time. Of the regions 205c, 205d, charge accumulates in the region 205d of high potential in which no barrier region is formed.

Thereafter the accumulated charges ar0065 transferred in the direction of transfer and accumulated in sequence by the switching of the logic levels of the clock signals P1, P2 in this way between the H level and the L level.

Next, a description will be given of the line sensor 100 pertaining to the embodiment.

FIG. 5A, FIG. 5B, FIG. 5C and FIG. 5D are timing charts for explaining the operation of the image pick-up part 10 and charge integrator 20 that the line sensor 100 pertaining to the embodiment of this invention comprises and, FIG. 5E, FIG. 5F, FIG. 5G and FIG. 5H are timing charts for explaining the operation of the charge output part 30 and the readout part 40 that the line sensor 100 pertaining to the embodiment of this invention comprises.

First, a description will be given of the line sensor 100 with reference to FIG. 5A to FIG. 5D. An energy beam falls incident on the image pick-up part 10 prior to the time t1, and in each of the M×N photosensitive regions $12_{1,1}$ to $12_{M,N}$ charge is generated and accumulated in response to the incident energy beam.

First, at the time $t_1$, the logic level of the clock signal P1V input into each of M×N photosensitive regions $12_{1,1}$ to $12_{M,N}$ is L, and the logic level of the clock signal P2V input into each of M×N photosensitive regions $12_{1,1}$ to $12_{M,N}$ is H. At this time, the charges generated and accumulated by each of the M×N photosensitive regions $12_{1,1}$ to $12_{M,N}$ accumulate in the region of high potential formed by the clock signal P2V (logic level H).

The logic levels of the clock signals P1V, P2V are switched at the time $t_{1,1}$, and the logic level of the clock signal P1V input into each of the M×N photosensitive regions $12_{1,1}$ to $12_{M,N}$ is H and the logic level of the clock signal P2V input into each of the M×N photosensitive regions $12_{1,1}$ to $12_{M,N}$ is L. Accordingly, the charge generated and accumulated in the 1st photosensitive region $12_{1,n}$ is transferred to and accumulated in the 2nd photosensitive region $12_{2,n}$, and the charge generated and accumulated in the 2nd photosensitive region $12_{2,n}$ is transferred to and accumulated in the 3rd photosensitive region $12_{3,n}$. Other charges transferred to and accumulated in the (M−3) photosensitive regions $12_{3,n}$ to $12_{M-1,n}$ are similarly transferred and accumulated. In addition, the charge generated and accumulated by the Mth photosensitive region $12_{M,n}$ is output into the charge integrator 20.

The logic levels of the clock signals P1V, P2V are switched at the time $t_{1,2}$, and the logic level of the clock signal P1V input into each of the M×N photosensitive regions $12_{1,1}$ to $12_{M,N}$ is L and the logic level of the clock signal P2V input into each of the M×N photosensitive regions $12_{1,1}$ to $12_{M,N}$ is H. Accordingly, the charge transferred to and accumulated in the photosensitive regions $12_{2,1}$ to $12_{M,N}$ at the time $t_{1,1}$ is transferred to the region of high potential formed by the clock signal P2V (logic level H). It should be noted that this transfer occurs in each of the ((M−1)×N) photosensitive region $12_{2,1}$ to $12_{M,N}$ to which charges are transferred.

The logic levels of the clock signals P1V, P2V are switched at the time $t_{1,3}$, and the logic level of the clock signal P1V input into each of the M×N photosensitive regions $12_{1,1}$ to $12_{M,N}$ is H and the logic level of the clock signal P2V input into each of the M×N photosensitive regions $12_{1,1}$ to $12_{M,N}$ is L. Accordingly, the charge transferred to and accumulated in the 2nd photosensitive region $12_{2,n}$ at the time $t_{1,1}$ is transferred to and accumulated in the 3rd photosensitive region $12_{3,n}$, and the charge transferred to and accumulated in the 3rd photosensitive region $12_{3,n}$ at the time $t_{1,1}$ is transferred to and accumulated in the 4th photosensitive region $12_{4,n}$. The other charges transferred to and accumulated in the (M−4) photosensitive regions $12_{4,n}$ to $12_{M-1,n}$ at the time $t_{1,1}$ are similarly transferred and accumulated. In addition, the charge transferred to and accumulated in the Mth photosensitive region $12_{M,n}$ at the time $t_{1,1}$ is output to the charge integrator 20.

Similarly thereafter, the logic levels of the clock signals P1V, P2V are switched and the charges are output in sequence to the charge integrator 20. The time $t_{1,2M-2}$ has come.

At the time $t_{1,\,2M-2}$ the logic level of the clock signal P1V input into each of the M×N photosensitive regions $12_{1,1}$ to $12_{M,N}$ is L, and the logic level of the clock signal P2V input into each of the M×N photosensitive regions $12_{1,1}$ to $12_{M,N}$ is H. At this time, of the charges generated and accumulated in the M×N photosensitive regions $12_{1,1}$ to $12_{M,N}$ prior to the time $t_1$, only the charges generated and accumulated in the 1st photosensitive region $12_{1,n}$ accumulate in the Mth photosensitive region $12_{M,n}$ only. It should be noted that the charges remaining in the Mth photosensitive region $12_{M,n}$ is transferred to the region of high potential formed by the clock signal P2V (logic level H). This transfer occurs in the Mth photosensitive region $12_{M,n}$.

The logic levels of the clock signals P1V, P2V are switched at the time $t_{1,2M-1}$, and the logic level of the clock signal P1V input into each of the M×N photosensitive regions $12_{1,1}$ to $12_{M,N}$ is H and the logic level of the clock signal P2V input into each of the M×N photosensitive regions $12_{1,1}$ to $12_{M,N}$ is L. As a result of this input, the charge remaining in the Mth photosensitive region $12_{M,n}$ at the $t_{1,2M-2}$ is output to the nth integrator $21_n$ of the charge integrator 20.

Next, at the time $t_2$, the logic level of the clock signal P2V is L and the logic levels of the clock signals P1V P2V are both L. As a result of this input, each of the M×N photosensitive regions $12_{1,1}$ to $12_{M,N}$ are in a state in which they are prepared for the next incident energy beam.

In this way, the image pick-up part 10 transfers the charges generated and accumulated in the (m−1)th photosensitive region $12_{m-1,n}$ to the Mth photosensitive region $12_{M,n}$ by way of the (M−m) photosensitive regions $12_{m,n}$ to $12_{M-1,n}$ from an mth photosensitive region $12_{m,n}$ to an (M−1)th photosensitive region $12_{M-1,n}$, and outputs the charges generated and accumulated in each M photosensitive regions $12_{1,n}$ to $12_{M,N}$ to the charge integrator 20 in sequence from the charges generated and accumulated in the Mth photosensitive region $12_{M,n}$.

In addition, there is no switching of the logic levels of the clock signals $P1V_m$, $P2V_m$ input into each of the n integrators $21_1$ to $21_N$ in the period from the time $t_1$ to the time $t_2$. That is to say, the charge integrator 20 does not output charge to the charge output part 30. Accordingly, in the period from the time $t_1$ to the time $t_2$, the charges generated and accumulated in each of the M photosensitive regions $12_{1,1}$ to $12_{M,n}$ of the nth pixel part $11_n$ are integrated and accumulated in the nth integrator $21_n$ of the charge integrator 20.

In addition, the charges integrated and accumulated in the nth integrator $21_n$ at the time $t_2$ are integrated and accumulated in the region of high potential among the nth integrators $21_n$ formed by the clock signal $P1V_m$ (logic level H).

Thereafter, the logic levels of the clock signals $P1V_m$, $P2V_m$ are switched at the time $t_{2,1}$ and the logic level of the clock signal $P1V_m$ input into each of the N integrators $21_1$ to $21_N$ is L and the logic level of the clock signal $P2V_m$ input into each of the N integrators $21_1$ to $21_N$ is H. Accordingly, the charges integrated and accumulated in each of the N integrated parts $21_1$ to $21_N$ is transferred to the region of high potential formed by the clock signal P2Vm (logic level H). This transfer occurs in each of the N integrators $21_1$ to $21_N$.

The logic levels of the clock signals $P1V_m$, $P2V_m$ are switched at the time $t_3$, and the logic level of the clock signal $P1V_m$ input into each of the N integrators $21_1$ to $21_N$ is H and the logic level of the clock signal $P2V_m$ input into each of the N integrators $21_1$ to $21_N$ is L. Accordingly, the charges integrated and accumulated in the nth integrator $21_n$ at the time $t_2$ are output to the nth output part $31_n$ as a batch.

The description that follows is given with reference to FIG. 5E to FIG. 5H. It should be noted that a short circuit occurs between the terminal SG to which the clock signal $P1H_{SG}$ is input and the terminal 4a to which the clock signal P1H is input.

First, at the time $t_3$, the logic level of the clock signal P1H input into each of the N output parts $31_1$ to $31_N$ is L and the logic level of the clock signal P2H input into each of the N output parts $31_1$ to $31_N$ is H. Accordingly, the charges input into each of the N output parts $31_1$ to $31_N$ accumulate in the region of high potential formed by the clock signal P2H (logic level H).

The logic levels of the clock signals P1H, P2H are switched at the time $t_{3,1}$ and the logic level of the clock signal P1H input into each of the N output parts $31_1$ to $31_N$ is H and the logic level of the clock signal P2H input into each of the N output parts $31_1$ to $31_N$ is L. Accordingly, the charges accumulated in the 1st output part $31_1$ at the time $t_3$ are transferred to and accumulated in the 2nd output part $31_2$ and, at the time $t_3$, the charges accumulated in the 2nd output part $31_2$ are transferred to and accumulated in the 3rd output part $31_3$. In addition, at the time $t_3$, the charges accumulated in the other (N−3) output parts $31_3$ to $31_{N-1}$ are similarly transferred and accumulated. In addition, the charges accumulated in the Nth output part $31_N$ are output at the time $t_3$ to the readout part 40 and input into the summing gate part 41 of the readout part 40.

In addition, at the time $t_{3,1}$ the logic level of the reset signal $P_{RG}$ input into the gate terminal of the charge reset MOSFET 44 is H. Accordingly, the charges inflowing into the floating diffusion 43 are discharged, it is restored to its original electric potential, and the voltage of the connection point A is a voltage $V_{CC}$. Thereafter, the logic level of the reset signal $P_{RG}$ input into the gate terminal of the charge reset MOSFET is L. It should be noted that the reason for the change in the signal $V_{OS}$ at this time is because the voltage of a fixed positive voltage input into the terminal RD is input into the gate terminal of the charge voltage conversion MOSFET 45.

Next, the logic levels of the clock signals P1H and P2H are switched at the time $t_{3,2}$, and the logic level of the clock signal P1H input into each of the N output parts $31_1$ to $31_N$ is L and the logic level of the clock signal P2H input into each of the N output parts $31_1$ to $31_N$ is H. Accordingly, the charges transferred to and accumulated in each of the (N−1) output parts $31_2$ to $31_N$ at the time $t_{3,1}$ is transferred to the region of high potential formed by the clock signal P2H (logic level H). It should be noted that this transfer occurs in each of the (N−1) output parts $31_2$ to $31_N$ to which charges are transferred and accumulated.

In addition, a signal (clock signal $P1H_{SG}$) the same as the clock signal P1H is input into the summing gate part 41 at the time $t_{3,2}$ and at the time $t_{3,1}$ the charges accumulated in the summing gate part 41 is output to the output gate part 42. The charges pass though the output gate part 42 and inflow into the floating diffusion 43.

The electric potential of the floating diffusion 43 changes at this time, and a voltage $V_e$ proportionate to the inflow charge amount is subtracted from the voltage $V_{CC}$, and the voltage equivalent to this subtracted voltage ($V_{CC}-V_e$) is input into the gate terminal of the charge voltage conversion MOSFET 45. Accordingly, the voltage of the electric signal $V_{OS}$ is lower than when the voltage of voltage $V_{CC}$ is input into the charge voltage conversion MOSFET 45.

The logic levels of the clock signals P1H and P2H are switched at the time $t_{3,3}$, and the logic level of the clock signal P1H input into each of the N output parts $31_1$ to $31_N$ is H and the logic level of the clock signal P2H input into each of the N output parts $31_1$ to $31_N$ is L. Accordingly, the charges transferred to and accumulated in the 2nd output part $31_2$ at the time $t_{3,1}$ are transferred to and accumulated in the 3rd output part $31_3$, and the charge transferred to and accumulated in the 3rd output part $31_3$ at the time $t_{3,1}$ is transferred to and accumulated in a 4th output part $31_4$. Other charges similarly transferred to and accumulated in the (N−4) output parts $31_4$ to $31_{N-1}$ are transferred to and accumulated at the time $t_{3,1}$. In addition, the charge transferred to and accumulated in the Nth output part $31_N$ at the time $t_{3,1}$ is output to the readout part 40 and input into the summing gate part 41 of the readout part 40.

In addition, the logic level of the reset signal $P_{RG}$ input into the gate terminal of the charge reset MOSFET 44 at the time $t_{3,3}$ is H. Accordingly, the charge inflowing into the floating diffusion 43 is discharged, it is restored to its original potential, and the voltage of the connection point A is the voltage $V_{CC}$. Thereafter, the logic level of the reset signal $P_{RG}$ input into the gate terminal of the charge reset MOSFET 44 is changed to L. It should be noted that the reason for the change in the signal $V_{OS}$ at this time is because the voltage of a fixed positive voltage input into the terminal RD is input into the gate terminal of the charge voltage conversion MOSFET 45.

Next, the logic levels of the clock signals P1H and P2H are switched at the time $t_{3,4}$, and the logic level of the clock signal P1H input into each of the N output parts $31_1$ to $31_N$ is L and the logic level of the clock signal P2H input into each of the N output parts $31_1$ to $31_N$ is H. Accordingly, the charges transferred to and accumulated in each of the (N−2) output parts $31_3$ to $31_N$ at the time $t_{3,3}$ is transferred to the region of high potential formed by the clock signal P2H (logic level H). It should be noted that this transfer occurs in each of the (N−2) output parts $31_3$ to $31_N$ to which charges are transferred and accumulated.

In addition, because of the input of a signal (clock signal $P1H_{SG}$) the same as the clock signal P1H, at the time $t_{3,3}$ the charge accumulated in the summing gate part 41 is output to the output gate part 42. This charge passes through the output gate part 42 and inflows into the floating diffusion 43.

The electric potential of the floating diffusion 43 changes at this time, and a voltage $V_e$ proportionate to the inflow charge amount is subtracted from the voltage $V_{CC}$, and the voltage equivalent to this subtracted voltage ($V_{CC}-V_e$) is input into the gate terminal of the charge voltage conversion MOSFET 45. Accordingly, the voltage of the electric signal $V_{OS}$ is lower than when the voltage $V_{CC}$ is input into the charge voltage conversion MOSFET 45.

The time $t_{3,5}$ has come. Beyond the time $t_{3,5}$, operations identical to the operations implemented from the time $t_{3,3}$ to the time $t_{3,5}$ are repeated, and the charges input into each of the N output parts $31_1$ to $31_N$ of the charge output part 30 are output to the readout part 40 in sequence, and the charges input to the readout part 40 are output as electric signals in sequence.

By virtue of the fact that, based on the above, the line sensor 100 pertaining to this embodiment comprises an M photosensitive regions $12_{1,n}$ to $12_{M,n}$ in an nth pixel part $11_n$ and the charges generated and accumulated in each M photosensitive regions $12_{1,n}$ to $12_{M,n}$ that the nth pixel part $11_n$ comprises are integrated and accumulated by the nth integrator $21_n$, the sensitivity can be improved and the increase in noise can be suppressed.

In addition, the line sensor 100 pertaining to this embodiment can be shortened for the time from the start of the incident energy beam on the image pick-up part 10 until the charges are transferred and the next incident energy beam has started. A description of the shortening for the time that occurs at this time is given with reference to FIG. 6.

FIG. 6A, FIG. 6B and FIG. 6C are timing charts for explaining the operation of the image pick-up part 10, charge integrator 20 and charge output part 30 of the line sensor 100 pertaining to this embodiment. An energy beam falls incident on the image pick-up part 10 of the line sensor 100. When the energy beam falls incident, in each of the M×N photosensitive regions $12_{1,1}$ to $12_{M,N}$ that the N pixel parts $11_1$ to $11_N$ of the image pick-up part 10 comprises a charge is generated. Each of the M×N photosensitive regions $12_{1,1}$ to $12_{M,N}$ to accumulates the generated charge.

During the period from time $t_0$ to $t_1$ the charges generated and accumulated in each of the M×N photosensitive regions $12_{1,1}$ to $12_{M,N}$ are output in sequence to the charge integrator 20. All of the charges generated and accumulated in each of the M×N photosensitive regions $12_{1,1}$ to $12_{M,N}$ are integrated and accumulated in the charge integrator 20 until the time $t_1$.

Thereafter, during the period from the time $t_1$ to the time $t_2$, the integrated and accumulated charges are output by the charge integrator 20 to the charge output part 30 in a batch.

Next, during the period from the time $t_2$ to the time $t_3$, the charges input into each of the N output parts $31_1$ to $31_N$ are output by the charge output part 30 in sequence to the readout part 40. The charge output part 30 outputs all of the charges input into the readout part 40 until the time $t_3$.

In addition, during the period from the time $t_2$ to the time $t_3$, all of the charges generated and accumulated in the M×N photosensitive regions $12_{1,1}$ to $12_{M,N}$ are output to the charge integrator 20. In other words, charges are generated and accumulated in each of the M×N photosensitive regions $12_{1,1}$ to $12_{M,N}$ due to the incident energy beam and, during the period in which the image pick-up part 10 outputs these charges to the charge integrator 20 (period from the time $t_2$ to the time $t_3$), the charge output part 30 outputs charges to the readout part 40.

Thereafter, during the period from the time $t_3$ to the time $t_4$, the integrated and accumulated charges are output by the charge integrator 20 to the charge output part 30 in a batch. During the period from the time $t_4$ to the time $t_5$ the charges input into each of the N output parts $31_1$ to $31_N$ are output by the charge output part 30 to the readout part 40 in sequence, and all charges input until the time $t_5$ are output to the readout part 40. In addition, during the time $t_4$ to the time $t_5$, all charges generated and accumulated by the M×N photosensitive regions $12_{1,1}$ to $12_{M,N}$ are output to the charge integrator 20. Thereafter, the line sensor 100 repeats the operations implemented during the period from the time $t_2$ to the time $t_5$.

By virtue of the fact that, using the line sensor 100 pertaining to this embodiment in this way, during the period from the time $t_2$ to the time $t_3$ and so on an operation for the output to the readout part 40 of the charges accumulated in each of the N output parts $31_1$ to $31_N$ in sequence is implemented while an energy beam falls incident and while an operation for the output of the charges generated and accumulated in each of the M×N photosensitive regions $12_{1,1}$ to $12_{M,N}$ to the charge integrator 20 is implemented, the line sensor 100 can be shortened for the time from the start of the incident energy beam on the image pick-up part 10 until the charges are transferred and the next incident energy beam has started (for example, from time $t_0$ to time $t_2$, and from time $t_2$ to time $t_4$).

By way of example, the time for the (m−1)th photosensitive region $12_{m-1,n}$ to transfer its self-accumulated charge to the mth photosensitive region $12_{m,n}$ is taken as 5 μs (microseconds) and, in addition, the time for the Mth photosensitive region $12_{M,n}$ to transfer its self-accumulated charge to the charge integrator 20 is taken as 5 μs. In addition, the time taken for the (x−1)th output $31_{x-1}$ to transfer its self-accumulated charge to the xth output part $31_x$ is taken as 0.1 μs, and the time taken for the Nth output $31_N$ to transfer the self-accumulated charge to the readout part 40 is taken as 0.1 μs.

Now, it shall be supposed that M=128 and N=1024. In this case, the time taken for all charges accumulated in each of the 128×1024 photosensitive regions $12_{1,1}$ to $12_{128,1024}$ to be output from the image pick-up part 10 to the charge integrator 20 is 128 (number)×5 (μs)=640 μs.

In addition, the time taken to output all the charges accumulated in each of the 1024 output parts $31_1$ to $31_{1024}$ to the readout part 40 is 1024 (number)×0.1 (μs)=102.4 μs. However, by virtue of the fact that, in the line sensor 100 pertaining to this embodiment and as described with reference to FIG. 6, an operation to output the charges accumulated in each of the 1024 output parts $31_1$ to $31_{1024}$ to the readout part 40 in sequence is implemented while an energy beam falls incident and while an operation for the output to the charge integrator 20 of the charges generated and accumulated in each of the 128×1024 photosensitive regions $12_{1,1}$ to $12_{128,1024}$ is implemented, the time taken from after the start of the incident energy beam on the image pick-up part 10 until the charges are transferred and the next incident energy beam has started (for example, from time $t_0$ to time $t_3$, and from time $t_3$ to time $t_6$ ($t_6$ is the time when the charge is output to charege output part 30 after $t_5$) ) is $(655+T)\mu s$. It should be noted that the time taken for the output of the charges from the charge integrator 20 to the charge output part 30 in a batch is taken as 15 µs, and the input time of a single energy beam is taken as T µs.

If an operation for the output to the readout part 40 of the charges accumulated in each of the 1024 photosensitive regions $31_1$ to $31_{1024}$ in sequence must be performed following the falling incident of the energy beam and the implementation of the operation for the output to the charge integrator 20 of the charges generated and accumulated in each of the 128×1024 photosensitive regions $12_{1,1}$ to $12_{128,1024}$, the time taken is $(757.4+T)\mu s$.

By the implementation of an operation for the output to the readout part 40 of the charges accumulated in each of the N output parts $31_1$ to $31_N$ in sequence while an energy beam falls incident and an operation for the output of the charges generated and accumulated in each of the M×N photosensitive regions $12_{1,1}$ to $12_{M,N}$ to the charge integrator 20 in this way, the time taken from after the start of the incident energy beam on the image pick-up part 10 until the charges are transferred and the next incident energy beam has started (for example, from time $t_0$ to time $t_3$, and from time $t_3$ to time $t_6$) can be shortened.

In addition, if M=16 and N=1024 the time taken to output all charges from the image pick-up part 10 is 80 µs and the time for the output of all charges accumulated in the charge output part 30 is 102.4 µs, and these two times are substantially the same. In this case, by the implementation of an operation for the output to the readout part 40 of the charges accumulated in each of the N photosensitive regions $31_1$ to $31_N$ in sequence while an energy beam falls incident and an operation for the output to the charge integrator 20 of the charges generated and accumulated in each of the M×N photosensitive regions $12_{1,1}$ to $12_{M,N}$ is implemented, there is no waste of the time taken from after the start of the incident energy beam on the image pick-up part 10 until the charges are transferred and the next incident energy beam has started (for example, from time $t_0$ to time $t_3$, and from time $t_3$ to time $t_6$) and a more efficient shortening for the time can be performed.

By virtue of the fact that, based on the line sensor 100 pertaining to this embodiment as described above, in an M×N photosensitive regions $12_{1,1}$ to $12_{M,N}$ charge is generated and accumulated due to an incident energy beam and, while an image pick-up part 10 outputs these charges to a charge integrator 20, a charge output part 30 outputs charges to the readout part 40, the time taken from after the start of the incident energy beam on the image pick-up part 10 until the charges are transferred and the next incident energy beam has started (for example, from time $t_0$ to time $t_3$, and from time $t_3$ to time $t_6$) can be shortened.

As is described above, the abovementioned line sensor 100 comprises an image pick-up part 10 formed by a plurality of vertical shift registers $11_1$ to $11_N$ arranged in the horizontal direction, a charge output part 30 configured form horizontal shift registers that extend in the direction of arrangement of photosensitive regions $12_{M,1}$ to $12_{M,N}$ of the end of each of the vertical shift registers $11_1$ to $11_N$, and a charge integrator 20, positioned between the image pick-up part 10 and the charge output part 30, which integrates (adds) the charges output from the respective vertical shift registers $11_1$ to $11_N$ in accumulation regions $21_1$ to $21_N$ corresponding to each of the vertical shift registers $11_1$ to $11_N$, wherein the accumulation regions $21_1$ to $21_N$ simultaneously transfer the accumulated charges to the output parts $31_1$ to $31_N$ of the horizontal shift registers 30.

In this line sensor 100, while on the one hand the amount of noise generated in the photosensitive regions $12_{1,1}$ to $12_{M,N}$ is suppressed by the configuring of the image pick-up part 10 by the arrangement of photosensitive regions $12_{1,1}$ to $12_{M,N}$ of small saturation charge amount in a 2-dimensional shape, a line-binning operation is implemented by the charge integrator 20 of large saturation charge amount. By the temporary accumulation of charges in the charge integrator 20, the vertical transfer time of the charges in the image pick-up part 10 and the horizontal transfer time of the charges of the horizontal shift registers 30 can be overlapped resulting in a shortening of the pick-up time.

That is to say, the line sensor 100 comprises a charge integrator 20 that spatially compresses along one direction (vertical direction) and temporarily accumulates the charge distribution generated by a 2-dimensional image pick-up part 10, and a horizontal shift register 30 that is adjacent to said charge integrator 20 and transfers inflow charges in a time sequence in the horizontal direction.

As is described in detail above, by virtue of the fact that, in the line sensor pertaining to the present invention, each of an N pixel parts comprise a plurality of photosensitive regions, and the charges generated and accumulated in each of the plurality of photosensitive regions that the nth pixel part comprises are integrated and accumulated in an nth integrator, the sensitivity can be improved and the increase in noise can be suppressed.

What is claimed is:

1. A line sensor in which an N (N is an integer of 2 or more) pixel parts are arranged in one direction, characterized in that it comprises:
   an image pick-up part, comprising said N pixel parts each comprising an M photosensitive regions (M is an integer of 2 or more) in that charge is generated and accumulated in response to an incident energy beam, which outputs the charges generated and accumulated by said M photosensitive regions that each said N pixel parts comprise;
   a charge integrator, comprising an N integrators, to which the charges generated and accumulated in said M photosensitive regions that an nth (n is any integer of 1 or more and no more than N) pixel part of said image pick-up part comprises are input, and which integrates and accumulates the input charges in an nth integrator, and outputs all of the charges integrated and accumulated in each said N integrators in a batch; and
   a charge output part, comprising an N output parts, to which the charges output from said nth integrator of said charge integrator are input, and which accumulates the input charges in an nth output part, and outputs the charges accumulated in each said N output parts in sequence.

2. The line sensor according to claim 1, characterized in that the saturation charge amount of said nth integrator is larger than the sum of the saturation charge amounts of each of said M photosensitive regions that said nth pixel part comprises,
   and the saturation charge amount of said $n^{th}$ output part is either larger than the saturation charge amount of said nth integrator or substantially equivalent to the saturation charge amount of said nth integrator.

3. The line sensor according to claim 1, characterized in that said image pick-up part transfers the changes generated and accumulated by an (m−1)th photosensitive region (m is any integer of 2 or more and no more than M) to the Mth photosensitive region by way of an (M−m) photosensitive regions from an mth photosensitive region to an (M−1)th photosensitive region, and outputs the charges generated and accumulated by said each M photosensitive regions to said charge integrator in sequence from the charges generated and accumulated in said Mth photosensitive region.

4. A line sensor, characterized in that it comprises an image pick-up part formed by a plurality of vertical shift registers arranged in the horizontal direction, a charge output part configured from horizontal shift registers that extend in the direction of arrangement of the end of said vertical shift registers, and a charge integrator, positioned between said image pick-up part and said charge output part, which integrates all of the charges output from the respective said vertical shift registers in accumulation regions corresponding to each said vertical shift registers, wherein the respective said accumulation regions simultaneously transfer the accumulated charges to said horizontal shift registers.

* * * * *